US008020152B2

(12) United States Patent
Wadsworth et al.

(10) Patent No.: US 8,020,152 B2
(45) Date of Patent: Sep. 13, 2011

(54) CODE MORPHING

(75) Inventors: Brandon Scott Wadsworth, Redmond, WA (US); Stephen Craig Schertz, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 999 days.

(21) Appl. No.: 11/064,865

(22) Filed: Feb. 24, 2005

(65) Prior Publication Data
US 2006/0190937 A1 Aug. 24, 2006

(51) Int. Cl.
G06F 9/44 (2006.01)
G06F 9/45 (2006.01)
(52) U.S. Cl. .......................... 717/126; 717/140
(58) Field of Classification Search .................. None
See application file for complete search history.

(56) References Cited

U.S. PATENT DOCUMENTS

| 5,903,761 | A  | * | 5/1999  | Tyma ............................. 717/148 |
| 7,669,188 | B2 | * | 2/2010  | Nickell et al. .................. 717/126 |
| 2003/0106049 | A1 | * | 6/2003  | Ungar ............................ 717/143 |
| 2003/0145190 | A1 | * | 7/2003  | Faraboschi .................... 712/234 |
| 2003/0191940 | A1 | * | 10/2003 | Sinha et al. .................... 713/176 |
| 2004/0172637 | A1 | * | 9/2004  | Koutyrine ...................... 719/328 |

FOREIGN PATENT DOCUMENTS
WO WO 99/01815 * 1/1999

OTHER PUBLICATIONS

Wu et al., "A BNF-Based Automatic Test Program Generator for Compatible Microprocessor Verification", Jan. 2004, ACM, pp. 105-132.*
Necula et al., "CIL: Intermediate Language and Tools for Analysis and Transformation of C Programs", 2002, Springer-Verlag Berlin Heidelberg, pp. 213-228.*
Necula et al., "CCured: Type-Safe Retrofitting of Legacy Code", Jan. 16, 2002, ACM, pp. 128-139.*
van den Brand el al., "Compiling Language Definitions: The ASF+SDF Compiler", Jul. 2002, ACM, pp. 334-368.*
Douglas Low, "Protecting Java Code via Code Obfuscation", 1998, ACM, vol. 4, Issue 3, pp. 1-7.*
Lacey et al., "Imperative Program Transformation by Rewriting", Springer-Verlag Berlin Heidelberg 2001, pp. 52-68.*
Baxter et al., "DMS: Program Transformations for Practical Scalable Software Evolution", Jul. 23, 2004, IEEE, pp. 1-10.*
Eelco Visser, "Program Transformation with Stratego/XT: Rules, Strategies, Tools, and Systems", Feb. 2004, Springer-Verlag, pp. 1-23.*
T. Muller; EP Search Report; Aug. 7, 2006; Munich.
Lieh-Ming Wu, Kuochen Wang, and Chuang-Yi Chiu; A BNF-Based Automatic Test Program Generator for Compatible Microprocessor Verification, vol. 9, No. 1, Jan. 1, 2004; pp. 105-132.

* cited by examiner

Primary Examiner — Michael J Yigdall
Assistant Examiner — Ben Wang
(74) Attorney, Agent, or Firm — Workman Nydegger

(57) ABSTRACT

Code morphing includes rewriting at least one underlying control structure of known code without affecting an intended context of the code.

18 Claims, 4 Drawing Sheets

CODE MORPHING

DRAWINGS

The detailed description refers to the following drawings.

DETAILED DESCRIPTION

Context-preserving code morphing is described herein.

Figure 1:
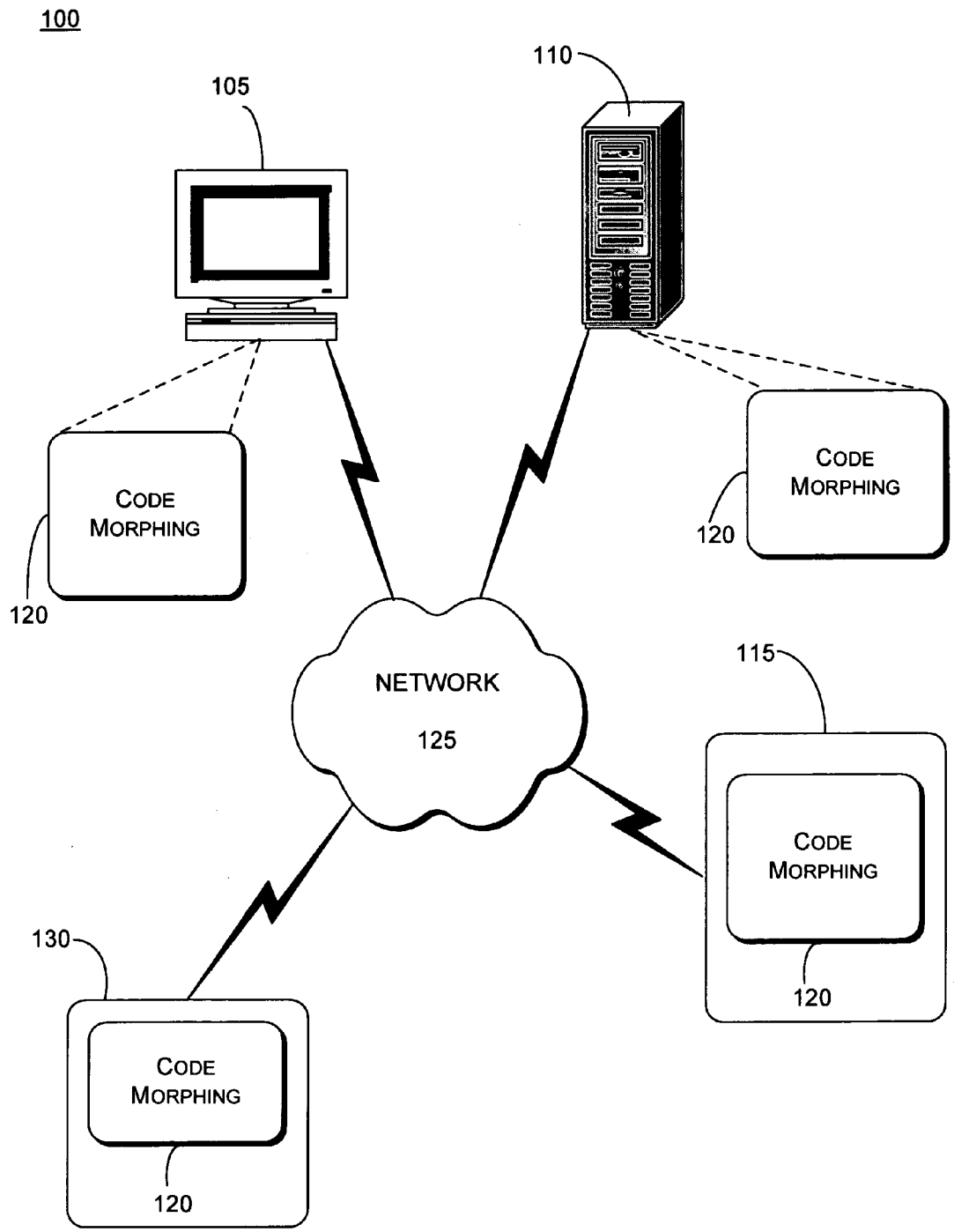
FIG. 1 shows a network environment in which examples of code morphing may be implemented.

FIG. 1 shows an example network environment in which context-preserving code morphing may be implemented. More particularly, any one of client device 105, server device 110, "other" device 115, and data source 130 may be capable of code morphing 120, as described herein. Further, devices 105, 110, 115, and 130 may be communicatively coupled to one another through network 125. Therefore, code morphing 120 may be implemented by any of devices 105, 110, 115, and 130 utilizing at least one application, program, method, function, or other assemblage of programmable and executable code that was generated locally or that was generated at any other of devices 105, 110, 115, and 130.

Client device 105 may be at least one of a variety of conventional computing devices, including, but not limited to, a desktop personal computer (PC), workstation, mainframe computer, Internet appliance, set-top box, and media device. Further, client device 105 may be at least one of any device that is capable of being associated with network 125 by a wired and/or wireless link, including, but not limited to, a personal digital assistant (PDA), laptop computer, cellular telephone, etc. Further still, client device 105 may represent the client devices described above in various quantities and/or combinations thereof. "Other" device 115 may also be embodied by any of the above examples of client device 105.

Server device 110 may provide any of a variety of data and/or functionality, including those for code morphing 120, to client device 105 or "other" device 115. The data or functionality for code morphing 120 may be publicly available or alternatively restricted, e.g., restricted to only certain users or only if an appropriate subscription or licensing fee is paid. Server device 110 may be at least one of a network server, an application server, a web blade server, or any combination thereof. Typically, server device 110 may be any device that is the source of content, and client device 105 may be any device that receives such content either via network 125 or via an off-line medium. However, according to the example implementations described herein, server device 110 and client device 105 may interchangeably be a sending host or a receiving host. "Other" device 115 may also be embodied by any of the above examples of server device 110.

"Other" device 115 may further be any device that is capable of code morphing 120 according to one or more of the examples described herein, in either of a managed execution environment or a testing environment. That is, "other" device 115 may be any software-enabled computing or processing device that is capable of morphing code while preserving the context of the application, program, method, function, or other assemblage of programmable and executable code to which the code corresponds. Thus, "other" device 115 may be a computing or processing device having at least one of an operating system, an interpreter, converter, compiler, or managed execution environment implemented thereon. These examples are not intended to be limiting in any way, and therefore should not be construed in such manner.

Network 125 may represent any of a variety of conventional network topologies, which may include any wired and/or wireless network. Network 125 may further utilize any of a variety of conventional network protocols, including public and/or proprietary protocols. For example, network 125 may include the Internet, an intranet, or at least portions of one or more local area networks (LANs).

Data source 130 may represent any one of a variety of conventional computing devices, including a desktop personal computer (PC), that may be capable of code morphing 120 in connection with an application, program, method, function, or other assemblage of programmable and executable code, which may or may not be written in object-oriented code. Alternatively, data source 130 may also be any one of a workstation, mainframe computer, Internet appliance, set-top box, media device, personal digital assistant (PDA), laptop computer, cellular telephone, etc., that may be capable of transmitting at least a portion of an application, program, method, or function to another work station. Further, although data source 130 may be a source of code for the application, program, method or function upon which code morphing 120 may be predicated, data source 130 may further be regarded as at least the source of code that results from an implementation of code morphing 120. Regardless of the implementation, known applications, programs, methods, or functions that may serve as a basis for code morphing 120 may be transmitted from data source 130 to any of devices 105, 110, and 115 as part of an on-line notification via network 125 or as part of an off-line notification.

Code morphing 120 may include rewriting at least one underlying control structure of real world code (alternately referred to hereafter as a "customer application") to generate code that is syntactically different than the real world code yet retains the original semantic context or meaning as the real world code. As a result, in a testing environment for instance, a processing component may be tested by receiving and/or executing morphed code that is syntactically different yet contextually consistent with an actual customer application to thereby provide the component with a realistic test scenario. That is, the processing component may produce a realistic and understandable test result since a processing result for the customer application may already be known, and therefore may serve as a comparative basis for a processing result of the morphed code. In addition to a testing environment, code morphing 120 may have further relevance when implemented in an unmanaged execution environment or a managed execution environment.

Code morphing may be implemented by rewriting at least one underlying control structure of a customer application while retaining an intended context of the customer application, as stated above. More particularly, such rewriting may include one or more "morphs," which may be directed towards at least one of the syntax and structure of the customer application. Examples of such morphs include, but are in no way limited to: method external structure morphs, method internal structure morphs, reduction of code morphs, optimization targeted morphs, and storage mutation morphs.

Figure 2:
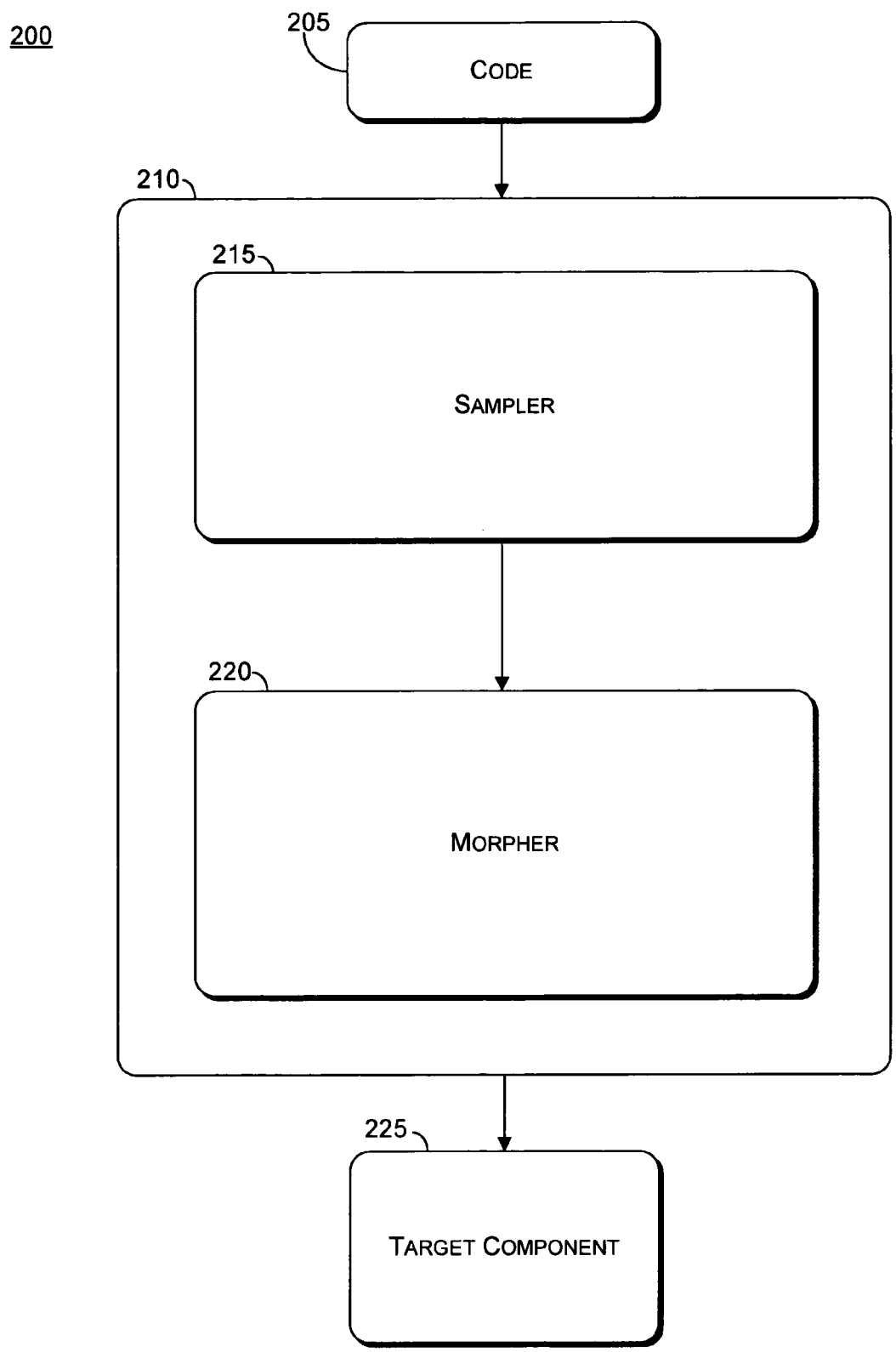
FIG. 2 shows a processing flow for at least one example implementation of code morphing.

FIG. 2 shows processing flow 200 as an example implementation of code morphing 120 (see FIG. 1).

Code 205 may refer to, at least, one or more applications, programs, methods, functions, or other assemblages of programmable and executable code. According to at least one example of code morphing 120, code 205 may be real world code written in intermediate language (hereafter "IL") or assembly language. Both IL and assembly language may be used as an intermediary between a high-level source code and a target (i.e., machine-readable) code.

However, code 205 is not limited to the examples of IL and assembly language. Rather, for implementation of code morphing 120, code 205 may be written in any one of a variety of known languages for which at least one of multiple syntactic characteristics and construct properties may be sampled.

Generator 210 may be regarded as a component or module in which at least portions of code morphing 120 may be implemented. Various operations associated with generator 210 may be performed by sampler 215 and morpher 220, either singularly or in concert together. Alternatively, operations associated with generator 210 may be carried out by the component or module itself, or by the component or module in cooperation with the network node in which the module is included or associated (i.e., by a processor or processors in which generator 210 is included or associated). In other implementations, the operations of generator 210, including those of sampler 215 and morpher 220, may be implemented as hardware, firmware, or some combination of hardware, firmware, and software, either singularly or in combination therewith.

Further still, the components or modules of generator 210 may be provided as separate components or modules, as depicted in FIG. 2, in a common environment. However, at least one alternative embodiment of generator 210 may dispose the corresponding components or modules in separate processing environments. Even further, the components or modules of generator 210 may be provided as a single component or module.

Sampler 215 may receive code 205 from, e.g., server device 110 or data source 130 (see FIG. 1). As set forth above, code 205 may be provided in, e.g., IL or assembly language code. Typically, then, sampler 215 may be able to sample and/or decipher the syntactic characteristics and construct properties of the language in which code 205 is written. Accordingly, a determination may be made as to which portion or portions of code 205 may be morphed at least one of syntactically and structurally, while still retaining the original context or intention of that portion of portions of code 205. A further determination may be made as to how a morph of code 205 is to be implemented.

For example, code 205, or portions thereof, may include data that may be read by sampler 215. Such data may indicate which portion or portions of code 205 may be morphed syntactically, structurally, or both. Alternatively, sampler 215 may examine code 205, or portions thereof, for context therein; and such context, which may be a coding pattern, may be determined to be a candidate for morphing. Examples of such context, or patterns, are described below with reference to the example of FIG. 3.

Morpher 220 may leverage the aforementioned determinations regarding which portion of code 205 is to be morphed and which manner the morph is to be implemented to rewrite at least one underlying control structure of code 205 to generate morphed code that is syntactically different yet contextually consistent with code 205 as previously input to generator 210. The morphed version of code 205 may be utilized in, e.g., a testing environment, although such scenario is provided only as an example and is not intended to be limiting in any manner.

The "morphs" may be regarded as benign manipulations of at least one of syntax or structure (i.e., constructs) corresponding to at least a portion of an application, program, method, function, or other assemblage of programmable and executable code. More particularly, multiple permutations of morphed code may be generated by re-coding, replacing, or otherwise restructuring at least one portion of code 205. Thus, in a testing environment, customer applications may be leveraged to generate complex test cases that target difficult use of real components or modules.

Target component 225 may be a component or module that is to receive one or more variations of morphed code (i.e., code having one or more portions that have been re-coded, replaced, or otherwise restructured at generator 210, particularly morpher 220). Target component 225 may benefit from receiving the morphed code in a testing environment. That is, morpher 220 may generate morphed code on the order of millions or even billions depending upon the volume of applications, programs, methods, functions, or other assemblages of programmable and executable code received as code 205 at generator 210. Another factor that may influence the number of variations of morphed code generated at generator 210 may include the volume of morphs, themselves, that are to be tested relative to either code 205 or target component 225. Thus, target component 225 may be exposed to a considerable amount of test code for which results are known and, therefore, bugs and other problems with the morphs relative to code 205 and/or target component 225 may be quickly identified.

Figure 3:
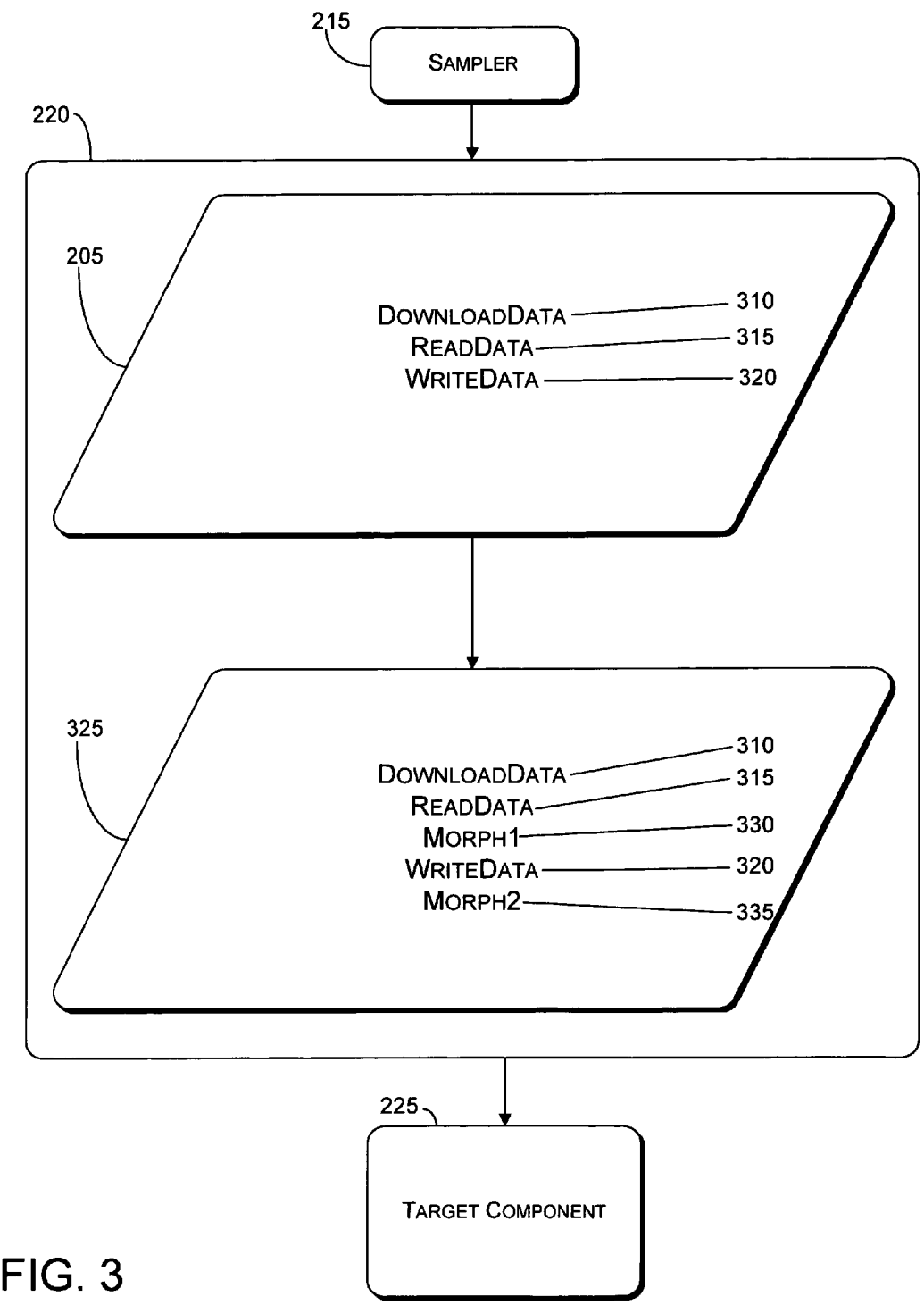
FIG. 3 shows an example statistical table in accordance with at least one example implementation of code morphing.

FIG. 3 shows an example of code morphing 120 (see FIG. 1). More particularly, the example depicts a transformation of code 205 into morphed code 325, as implemented by morpher 220 (see FIG. 2). Thus, the example of FIG. 3 is described with reference to various features depicted in FIG. 2.

Code 205 may include at least a portion of a program, method, operation, application, function, or other assemblage of programmable and executable code for which morphing may be implemented. In the example of FIG. 2, code 205 may include the methods of DownloadData 310, ReadData 315, and WriteData 320.

According to at least one example, code 205 may be sampled by sampler 215 to determine which portion or portions of code 205 may be morphed with regard to syntax or structure, or both, while still retaining the original context or intention of code 205 and, further, which morph or morphs may be implemented. According to alternative examples, the decisions regarding where and how to morph code 205 may be made without the benefit of sampler 215, and therefore code 205 may be input directly to morpher 220.

Morphed code 325 may comprise code 205 having at least one underlying control structure rewritten in a benign manner so that morphed code 325 and code 205 have a same semantic meaning but different syntax and/or structure. Morph1 330 and Morph2 335 may be syntactic or structural morphs, or a combination of both, that may be injected into code 205 to produce morphed code 325. That is, Morph1 330 and Morph2 335, either singularly or in combination, may serve as benign transformations of one or more operations, applications, methods, functions, or other assemblages of programmable and executable code input as code 205. Further, it should be noted that code 205 is not limited to two morphs. Morph1 330 and Morph2 335 are provided as examples only.

Non-limiting examples of morphs, which may be implemented as Morph1 330 and Morph2 335 in FIG. 3 either singularly or in various combinations, include:

Method external structure morphs: code 205 may be morphed (i.e., at least one underlying control structure thereof being rewritten while retaining an original intended context) by adding parameters to methods, expanding the width of primitive types, or changing the order of parameters. For instance, the parameters added to methods may include simple object types, simple types, garbage collection types (in a managed execution environment), arrays, and value types.

Method internal structure morphs: code 205 may be morphed by changing a usage order of local variables; adding local variables; superfluously using external variables (e.g., using external static fields or using external methods, both native and non-side-effect managed); adding superfluous loops; stitching in control flow via exception handling (in a managed execution environment); unfolding one or more constants; replacing a constant with a method; and introducing false stack depth.

Reduction of code morphs: code 205 may be morphed by folding one or more constants; and rolling code into loops.

Optimization targeted morphs: code 205 may be morphed by rolling up one or more loops; and introducing one or more common sub-expressions. The effect of optimization targeted morphs may be to counter an optimization within code 205 or a portion thereof.

Mutation of storage morphs: code 205 may be morphed by converting through type locals; and converting locals into another storage space.

The morphs described above are provided as examples only, and are not intended to limit the implementations of code morphing 120 in any manner. Further, these and other examples of the morphs are intended to rewrite at least one underlying control structure of code 205 in a benign manner. That is, the morphs are intended to change at least the syntax or structure, or both, of code 205 without affecting a processing result of code 205 relative to target component 225. Therefore, the particular morphs implemented for code morphing 120 may be presumed to be benign, or may be implemented in an effort to test whether a particular one of the morphs is, in fact, benign.

Target component 225 may be a component or module that is to receive morphed code 325 (i.e., code 205 as morphed by one or more of the morphs described above). Target component 225 may benefit from morpher 220 generating morphed variations of code 205 in the order of millions or even billions depending upon the volume of methods, applications, programs, functions, or other assemblages of programmable and executable code received as code 205 into generator 210, particularly morpher 220. That is, target component 225 may be exposed to a high magnitude of test code for which expected results are known since it may be presumed that processing results for code 205 relative to target component 225 are known. Accordingly, bugs and or other defects with regard to the morphs, at least with regard to target component 225, may be easily detected.

Figure 4:
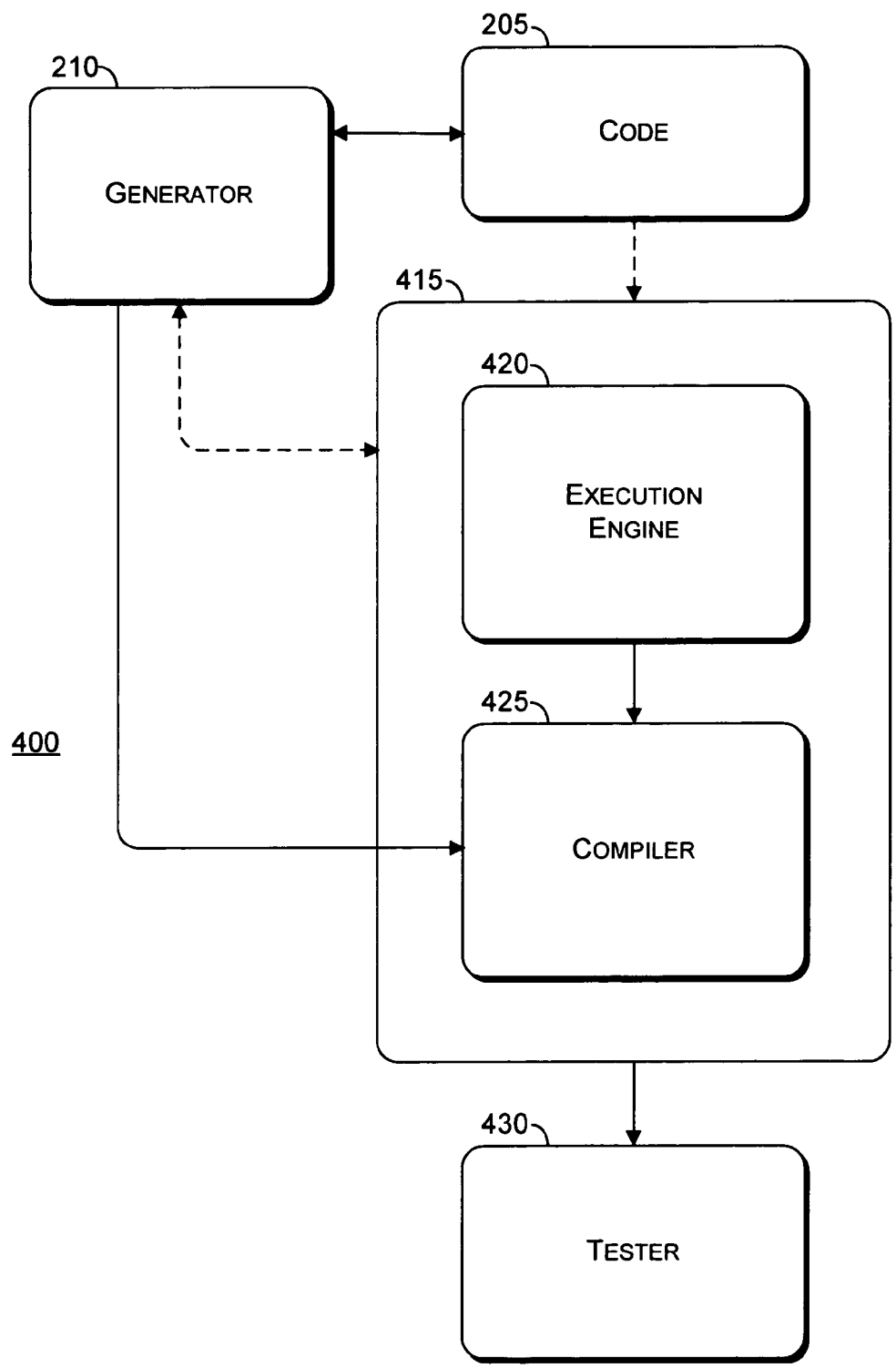
FIG. 4 shows an example of a system that is capable of implementing at least one example of code morphing.

FIG. 4 shows example system 400 in which code morphing 120 (see FIG. 1) may be implemented. More particularly, system 400 illustrates how code morphing 120 may be implemented in managed execution environment 415. System 400 is described below by referencing elements of both FIGS. 2 and 3. However, such construction and configuration of system 400 is provided only as an example, and should not be inferred as being limiting in any manner.

Managed execution environment 415 may provide one or more routines for an application program to perform properly in an operating system because an application, program, method, function, or other assemblage of programmable and executable code may require another software system in order to execute. Thus, such code may call one or more managed execution environment routines, which may reside between the application program and the operating system, and the managed execution environment routines may call the appropriate operating system routines.

Managed execution environments have been developed to enhance the reliability of software execution on a growing range of processing devices including servers, desktop computers, laptop computers, and a host of mobile processing devices. Managed execution environments may provide a layer of abstraction and services to an application running on a processing device (e.g., devices 105, 110, 115, and 130 described above in reference to FIG. 1). Managed execution environments may further provide such an application with capabilities including error handling and automatic memory management. Examples of managed execution environments may include: Visual Basic runtime execution environment; Java® Virtual Machine runtime execution environment that is used to run, e.g., Java® routines; or Common Language Runtime (CLR) to compile, e.g., Microsoft .NET™ applications into machine language before executing a calling routine.

Code 205, as described above with reference to FIGS. 2 and 3, may refer to one or more of, at least, applications, programs, methods, functions, or other assemblages of programmable and executable code written in e.g., IL or assembly language.

Generator 210, as described above with reference to FIG. 2, may refer to one or more components for implementing at least portions of code morphing 120. According to at least one example implementation, generator 210 may call into a data source to receive code 205 in an unmanaged execution environment. Alternatively, at least one example in a managed execution environment may include generator 210 calling into execution engine 420 to receive code 205.

Execution engine 420, at least, in a managed execution environment, may refer to a portion of code 205 that indicates how code 205 is to be managed and manipulated.

Regardless of how generator 210 receives code 205, generator 210 may implement example process 200 (see FIG. 2) by which morphed code 335 (see FIG. 3) is produced. That is, generator 210 may rewrite one or more underlying control structures (e.g., syntax, structure, or both) of code 205 in such a way that is semantically different yet contextually consistent with code 205 in its previous form. Further, generator 210 may utilize morphs, either tested or already proven, to generate multiple permutations of morphed code 325.

According to at least one example of a testing environment, generator 210 may then submit morphed code 325 to compiler 425 in managed execution environment 415. Thus, by being subjected to myriad of permutations of morphed code 325, the ability of compiler 425 to process different combinations of code and to expose coding bugs may be tested.

Compiler 425 may be regarded as just one example of a target object for the scores of permutations of morphed code 325 that may be generated by generator 210. However, purposeful, code morphing may be likely, though not exclusively, be intended for testing purposes. Thus, according to at least one alternative example of FIG. 4, the target of the randomly generated code may be any component or module within managed execution environment 415 for which purposeful testing may be accomplished by receiving scores (in the order of, at least, millions) of morphed code for which expected results are known.

Tester 430 may refer to a component or module, either in an unmanaged execution environment or within managed execution environment 415, that collects the testing data of compiler 425 or an alternative target object of the morphed code.

Accordingly, testing in both unmanaged and managed execution environments may be made more purposeful and effective by code that has at least one underlying control structure (e.g., syntactical characteristic or structural property) rewritten, and for which expected processing results are known.

The examples described above, with regard to FIGS. 1-4, may be implemented in a computing environment having components that include, but are not limited to, one or more processors, system memory, and a system bus that couples various system components. Further, the computing environment may include a variety of computer readable media that are accessible by any of the various components, and includes both volatile and non-volatile media, removable and non-removable media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A method, implemented within a computer system that includes one or more processors, for generating one or more test cases for testing for defects or bugs in a compiler, by benignly morphing syntax and/or structure of code having a known compilation result to generate morphed code that is syntactically different from the code, but which has the same semantic context of the code, and by comparing a result of compiling the morphed code with the compiler with the known compilation result, the method comprising:

an act of a computer system, which includes one or more processors, receiving code from a data source, wherein a first compilation result of compiling the received code is known;

an act of the computer system determining syntactical characteristics and construct properties of the received code in order to determine one or more portions of the received code which are to be benignly morphed in one or more of syntax or structure;

an act of the computer system benignly morphing the received code as a result of the determination of the syntactical characteristics and construct properties of the received code, wherein benignly morphing the received code includes injecting at least one selected morph to the one or more determined portions of the received code, wherein the at least one selected morph is at least one of expanding a width of a primitive type, superfluously using an external variable, replacing a method with a constant or converting locals into another storage space, and wherein the selected morph changes one or more of syntax or structure of the received code while preserving the same semantic context of the received code;

an act of the computer system compiling the benignly morphed code using the compiler to generate a second compilation result; and an act of the computer system testing for defects or bugs in the compiler by comparing the known first compilation result against the second compilation result, wherein when the first compilation result is different from the second compilation result it is determined that the compiler has at least one defect or bug relative to compiling the at least one selected morph.

2. The method according to claim 1, wherein the selected morph comprises expanding a width of a primitive type.

3. The method according to claim 1, wherein the selected morph comprises superfluously using an external variable.

4. The method according to claim 1, wherein the selected morph comprises converting locals into another storage space.

5. The method according to claim 1, wherein the selected morph comprises introducing false stack depth.

6. The method according to claim 1, wherein the at least one selected morph comprises a plurality of selected morphs, and wherein each of the plurality of selected morphs represents a test case for the compiler.

7. The method according to claim 6, wherein at least one of the plurality of selected morphs is randomly selected.

8. The method according to claim 1, wherein the received code comprises code written in a high-level source code language, and wherein the fist compilation result and the compilation result comprise target machine-readable code.

9. One or more computer storage device having stored thereon computer executable instructions that, when executed by one or more processors of a computer system, implement a method for generating one or more test cases for testing for defects or bugs in a compiler, by benignly morphing syntax and/or structure of code having a known execution result to generate morphed code that is syntactically different from the code, but which has the same semantic context of the code, and by comparing a result of compiling the morphed code with the compiler with the known execution result, the method comprising:
  an act of a computer system, which includes one or more processors, receiving code from a data source, wherein a first compilation result of compiling the received code is known;
  an act of the computer system determining syntactical characteristics and construct properties of the received code and, based on the determined syntactical characteristics and construct properties, determining one or more portions of the received code which are to be benignly morphed in one or more of syntax or structure;
  an act of the computer system benignly morphing the received code as a result of the determination of the syntactical characteristics and construct properties of the received code, wherein benignly morphing the received code includes injecting at least one selected morph to the one or more determined portions of the received code, wherein the at least one selected morph is at least one of expanding a width of a primitive type, superfluously using an external variable, replacing a method with a constant or converting locals into another storage space, and wherein the selected morph changes one or more of syntax or structure of the received code while preserving the same semantic context of the received code;
  an act of the computer system compiling the benignly morphed code using the compiler to generate a second compilation result; and
  an act of the computer system testing for defects or bugs in the compiler by comparing the known first compilation result against the second compilation result, wherein when the first compilation result is different from the second compilation result it is determined that the compiler has at least one defect or bug relative to compiling the at least one selected morph.

10. The computer storage device according to claim 9, wherein the selected morph comprises expanding a width of a primitive type.

11. The computer storage device according to claim 9, wherein the selected morph comprises superfluously using an external variable.

12. The computer storage device according to claim 9, wherein the selected morph comprises replacing a method with a constant.

13. The computer storage device according to claim 9, wherein the selected morph comprises converting locals into another storage space.

14. The method according to claim 9, wherein the received code comprises code written in an intermediate language or an assembly language.

15. A computer system, comprising:
  one or more processors; and
  one or more computer storage devices having stored thereon computer executable instructions which, when executed by the one or more processors, implement a method for generating one or more test cases for testing for defects or bugs in a target code processing component comprising a compiler, by benignly morphing syntax and/or structure of code having a known processing result to generate morphed code that is syntactically different from the code, but which has the same semantic context of the code, and by comparing a result of processing the morphed code with the target code processing component with the known processing result, the method comprising:
    the computer system receiving code from a data source, wherein a first processing result of processing the received code is known;
    the computer system determining syntactical characteristics and construct properties of the received code in order to determine one or more portions of the received code which are to be benignly morphed in one or more of syntax or structure;
    the computer system benignly morphing the received code as a result of the determination of the syntactical characteristics and construct properties of the received code, wherein benignly morphing the received code includes injecting at least one selected morph to the one or more determined portions of the received code, wherein the at least one selected morph is at least one of expanding a width of a primitive type, superfluously using an external variable, replacing a method with a constant or converting locals into another storage space, and wherein the selected morph changes one or more of syntax or structure of the received code while preserving the same semantic context of the received code;
    the computer system processing the morphed code using the compiler to generate a second processing result; and
    the computer system testing for defects or bugs in the compiler by comparing the known first processing result against the second processing result, wherein when the first processing result is different from the second processing result it is determined that the compiler has at least one defect or bug relative to processing the at least one selected morph.

16. The computer system according to claim 15, wherein the selected morph comprises expanding a width of a primitive type.

17. The computer system according to claim 15, wherein the selected morph comprises superfluously using an external variable.

18. The computer system according to claim 15, wherein the selected morph comprises replacing a method with a constant.

* * * * *